Patented Oct. 19, 1926.

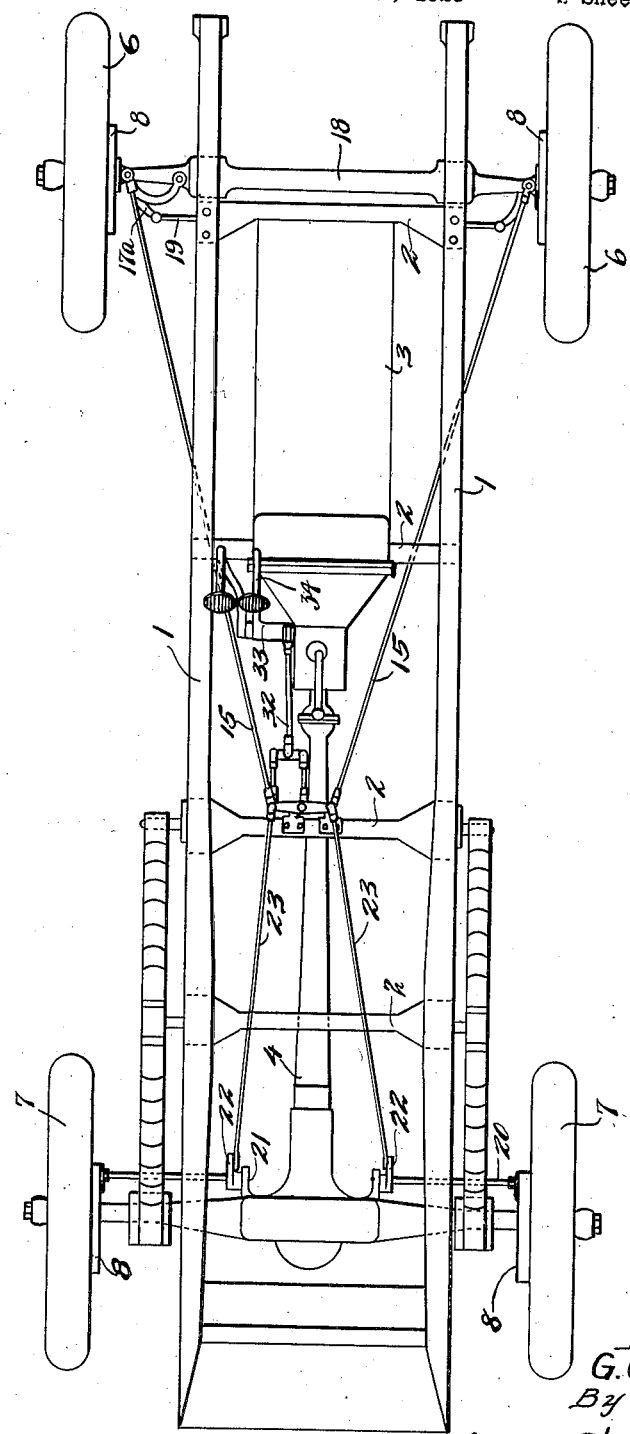

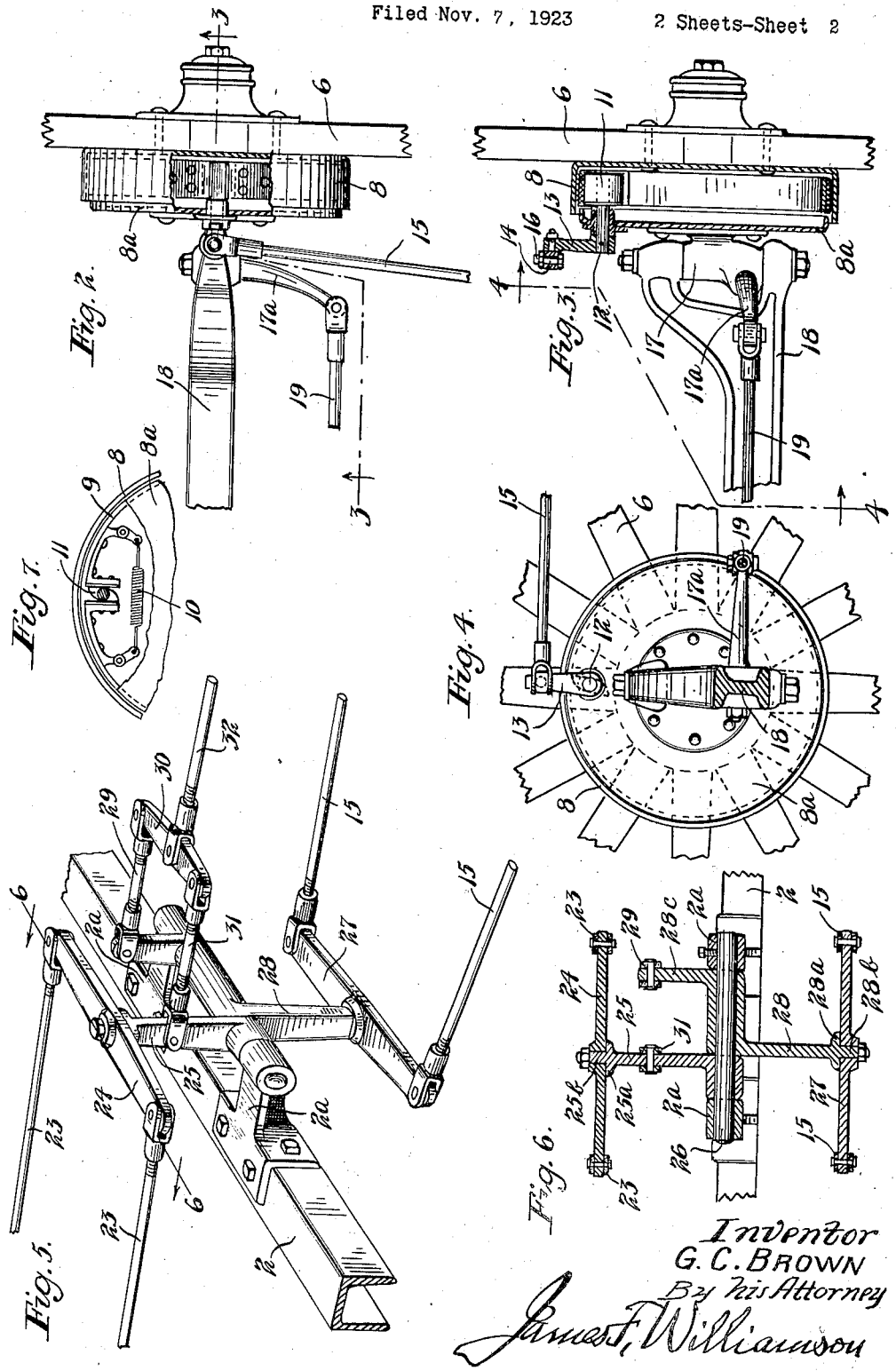

1,603,899

UNITED STATES PATENT OFFICE.

GRANT C. BROWN, OF DRESSER JUNCTION, WISCONSIN.

FOUR-WHEEL-BRAKE STRUCTURE.

Application filed November 7, 1923. Serial No. 673,293.

This invention relates to a brake mechanism for a vehicle, and particularly for a four-wheeled vehicle having brakes for all of the wheels. As is well known, it is necessary, in the modern automobile, to stop very quickly and a recent development in such vehicles is the application of brakes to all of the wheels. When using brakes on all of the wheels it is necessary to so operate them that the movement of the front wheels will not be influenced or prevented and to provide an equalizing means so that all of the brakes may be operated by a single operating means.

It is an object of this invention, therefore, to provide a four-wheeled vehicle with brakes on all the wheels, and means for operating said brakes comprising an equalizing mechanism whereby the brakes will be applied with substantially the same stress on all of the wheels.

It is also an object of the invention to provide brake mechanism for the front wheels and an operating member for each of said brake mechanisms which, in no way, interferes with the lateral turning of the front wheels for steering purposes.

It is another object of the invention to provide brakes on both of the front wheels and both of the rear wheels of the vehicle and to provide operating members for each of the brakes on the front wheels with an equalizing means therebetween and operating members for each of the brakes on the rear wheels with an equalizing means between said latter members.

It is more specifically an object of the invention to provide a vehicle having brakes on both front wheels, an equalizing means between the actuating means for said brakes, brakes on both rear wheels with an equalizing member between the actuating means for said latter brakes, together with members for simultaneously operating the front and rear wheels brake actuating means including an equalizing means between said latter members, which latter equalizing means is connected to an operating device adapted to be manipulated by the driver of a vehicle.

These and other objects and advantages of the invention will be fully set forth in the following description made in connection with the accompanying drawings in which like reference characters refer to the same parts throughout the different views, and in which, Fig. 1 is a plan view of the chassis of an automobile showing the wheels and the brake operating mechanism;

Fig. 2 is a plan view with a portion broken away illustrating the brake mechanism applied to the front wheel;

Fig. 3 is a vertical section taken on the line 3—3 of Fig. 2, as indicated by the arrows;

Fig. 4 is a view in side elevation, as seen at the left in Fig. 3, or as indicated by the line 4—4 of Fig. 3;

Fig. 5 is a perspective view of a portion of the brake operating mechanism;

Fig. 6 is a vertical section taken on the line 6—6 of Fig. 5, as indicated by the arrows; and Fig. 7 is a view in side elevation partly in vertical section, of the brake mechanism used.

Referring to the drawings, the frame of an automobile such as commonly used, is shown comprising longitudinal members 1 and various cross members 2. The motor casing is shown as 3, the drive shaft casing as 4, the front wheels as 6 and the rear as 7. Each of the wheels 6 and 7 is provided with a brake mechanism and while any suitable and desired brake mechanism may be used, in the embodiment of the invention illustrated, the brake mechanism is shown comprising drums with shoes at the interior thereof. The front wheels 6 have secured thereto at their inner sides cylindrical brake drums 8 and brakes shoes 9 are disposed in said drums and comprise semi-cylindrical members adapted to be separated or pushed apart to engage the inner cylindrical portions of the drums 8. The members 9 normally are drawn together by a tension coiled spring 10 so as to be out of contact with the drums 8 but said members are pushed apart or expanded to contact the drums by a suitable cam member 11, carried on shaft 12 mounted in the inner cover 8ª of the drum 8. The shaft 12 has an arm 13 projecting rearwardly therefrom and, as shown in Figs. 2 and 4, this arm extends upwardly and is pivoted in its outer end on a horizontal pivot or short sleeve 14. The sleeve 14 is embraced by the sides of a forked or bifurcated end of actuating rod 15, the pivot bolt 16 connecting said end and said sleeve. It will be seen that when the rod 15 is drawn rearwardly, the brake shoes 9 will be operated and the brake applied to the wheel. The front wheel 6 has secured thereto the usual steering knuckle 17 pivoted to the forked end of the front axle 18 and said steering knuckle has an arm 17ª pivoted to the usual steering rod 19. It will be understood, that each front wheel has the mechanism described and shown in Figs. 2 to 4, the brake actuating rods 15 being shown in Fig. 1 as extending rearwardly toward the center line of the frame. The rear wheels 7 are each provided with the brake mechanism such as described, the brake shoes on the rear wheels being expanded by a cam similar to the cam 11 which is mounted on shaft 20 journaled in the brake drum cover 8ª and in short bearings 21 illustrated as projecting forwardly from the rear axle housing. The shafts 20 have secured thereto short radially extending arms 22 and the actuating rods 23 for the rear wheel brakes are pivoted to the outer ends of said arms 22. As shown in Fig. 5, the rods 23 are provided with bifurcated members at their front ends which embrace and are pivoted to the ends of a bar 24. The bar 24 is pivoted at a point midway between the members 23 to the upper end of a lever 25. The lever 25 has a flange 25ª supporting the bar 24 and a pintle portion 25ᵇ extending vertically through said bar and forming the pivot therefor, said bar being held on said pivot by a nut threaded onto the reduced portion of the pintle 25ᵇ. The lever 25 has a hub portion which is journaled on the shaft 26 carried in spaced bearings 2ª secured to one of the cross members 2 of the vehicle frame. The rods 15, at their rear ends, are also provided with forks or bifurcated portions which embrace and are pivoted to the ends of a bar 27. The bar 27 is pivoted at a point midway between the members 15 to a downwardly extending lever 28 having a flange 28ª against which the bar 27 is disposed and a pintle 28ᵇ forming the pivot in the bar 27, which bar is held thereon by a nut threaded onto a reduced portion of said pintle. The lever 28 is also provided with a hub journaled on the shaft 26 and said hub is further provided with an upstanding arm 28ᶜ. A link 29 has one forked or bifurcated end pivoted to the upper end of the arm 28ᶜ and has its other forked or bifurcated end pivoted to one end of a bar 30. Another link 31 has a forked or bifurcated end embracing and pivoted to the other end of bar 30 and said link 31 has a forked or bifucated portion at its other end embracing the lever 25 and pivoted thereto by a horizontal pivot disposed the same radial distance from the shaft 26 as the pivot which connects link 29 to arm 28ᶜ The links 29 and 31 are formed with central portions screwed into the forked end portions thereof, the threads at the opposite end of said links being preferably right-handed and left-handed so that the links can be somewhat lengthened or shortened. It may be stated that the rods 15 and 23 are also threaded into the forked or bifurcated portions at their ends and are preferably provided with opposite ends with right and left handed threads. A rod 32 is threaded into a forked portion at its end which embraces and is pivoted about a vertical axis to the bar 30 midway between the links 29 and 31. The bar 32 is threaded into the forked or bifurcated portion at its other end which is pivoted on a horizontal axis and an arm projecting upwardly from a lever 33 secured to a shaft supported from the frame or the engine casing 3 and on which shaft the pedal lever 34 is journaled. The pedal portion of lever 34 will be disposed in the body of the car in convenient position for manipulation by the driver's foot.

In operation, when the car is running, the brakes on the wheels normally will be in inoperative position, as shown in Fig. 7. When it is desired to apply the brakes the operator or driver will press upon the pedal of lever 34 and will thus pull rod 32 toward the front of the machine. This rod, will, in turn, move bar 30 toward the front of the machine. The bar 30 will, in turn, act through the links 29 and 31 to move the levers 25 and 28, whereby rods 15 and 23 will be moved and the cams on the various brakes turned to set the brakes. If the brakes or the shoes 9 on one of the wheels should set or come into locked position before the other, the rod 23 connected to said brake will cease its longitudinal motion or be held from longitudinal movement and the other bar 23 will continue to move until the brake on the corresponding wheel has been set or engaged. If the brakes on the front wheels should be set before the brakes on the rear wheels the bar 27 will cease to move, as will also lever 28 and the motion of lever 25 and bar 24 will continue until the brakes on the rear wheels are set. This differential motion between the levers 25 and 28 is accomplished through the equalizing bar 30, said bar simply swinging about its pivotal connection with the operating rod 32, if one of the levers 25 or 28 is held against movement. It will thus be seen that there is an equalizing means between the brakes for the two front wheels and there is also an equalizing means between the brakes for the two rear wheels. It will also be clear that there is an equalizing means between the actuating means for the front and rear wheels which is the bar 30. It is certain, therefore, that all of the brakes will be engaged and if one of the brakes engages before the other, its actuating means will simply be arrested and the actuating means for the other brakes continued in motion until all of the brakes are set. When the operator releases the pressure on the lever 34, the springs 10 of the respective brakes will disengage the same and will swing the cams 11 to the position shown in Fig. 1, whereby the rods 15, 23 and 32 and the levers 25 and 28 will be moved to normal position. It will also be noted that the front wheel 6 can be turned for steering purposes while the brakes are set or disengaged. The arms 13 are connected to rods 15 substantially by a universal joint so that the lateral turning or steering movement of the wheels 6. It will be obvious that any one of the rods 15, 23, 32 or either of the links 29 and 31 can be lengthened or shortened slightly by a turning movement if this is desired to adjust the mechanism.

From the above description it is seen that applicant has provided a simple and efficient four-wheeled brake mechanism. The braking effect is quickly and uniformly applied to all of the wheels. The parts of the device are few and rigid so that no equalizing springs or cables are employed. The mechanism, therefore, requires practically no attention for maintenance or repair.

It will, of course, be understood that various changes may be made in the form, details, arrangement and proportions of the parts without departing from the scope of applicant's invention, which, generally stated, consists in a device capable of carrying out the objects above set forth, such as shown and described and defined in the appended claims.

What is claimed is:

1. A vehicle having in combination four wheels, a brake device on each of said wheels, brake actuating members for each of said brakes, a single shaft disposed transversely of the vehicle chassis, equalizing means interposed between the respective brake actuating members for the front wheels, equalizing means interposed between the respective brake actuating members for the rear wheels, equalizing means interposed between the said two mentioned equalizing means, means for operatively connecting all of said equalizing means to said single shaft and a single member connected to said third mentioned equalizing means for operating said mechanism to apply the brake devices on all of said wheels simultaneously at fixed relative pressures.

2. In a vehicle having four wheels and braking means on each wheel, a brake operating device comprising a single shaft mounted transversely of the frame of the vehicle, an arm pivoted to said shaft, a bell crank lever pivoted to said shaft, rods pivotally connected to said arm and to one arm of said bell crank lever, a bar pivoted at its ends to the free ends of said rods, a rod pivotally connected to substantially the central portion of said bar, means for operating said last mentioned rod, bars substantially centrally pivoted respectively to said arm and the free arm of said bell crank lever and brake actuating rods pivotally connected to the ends of said last mentioned bars, two of said actuating rods being connected to the braking means of the front wheels of the vehicle and two of said actuating rods being connected to the braking means of the rear wheels of the vehicle.

3. A vehicle having in combination, a frame, pairs of front and rear wheels, a brake on each of said wheels, a transverse shaft mounted on said frame, a two arm lever pivoted at its central portion to said shaft, a one arm lever pivoted at one end to said shaft, a bar centrally pivoted to one arm of said two arm lever, rods pivoted to the ends of said bar and extending to the respective brakes on one of said pairs of wheels for actuating the same, a bar centrally pivoted to the arm of said one arm lever, rods pivoted to the ends of said last mentioned bar and extending to the respective brakes on the other of said pairs of wheels for actuating the same, a link pivotally connected to the other arm of said two arm lever, a link pivotally connected to the arm of said one arm lever, a bar pivoted to the other ends of said links and an operating rod pivotally connected to the center of said bar connected to said links and adapted to be moved by the driver of the vehicle.

In testimony whereof I affix my signature.

GRANT C. BROWN.